March 12, 1957  F. C. FISHER  2,784,724
MACHINE FOR WASHING WATCH PARTS
Filed Aug. 8, 1955  3 Sheets-Sheet 1

INVENTOR.
FRANKLIN C. FISHER
BY Munn & Liddy
ATTORNEYS

March 12, 1957  F. C. FISHER  2,784,724
MACHINE FOR WASHING WATCH PARTS
Filed Aug. 8, 1955  3 Sheets-Sheet 2
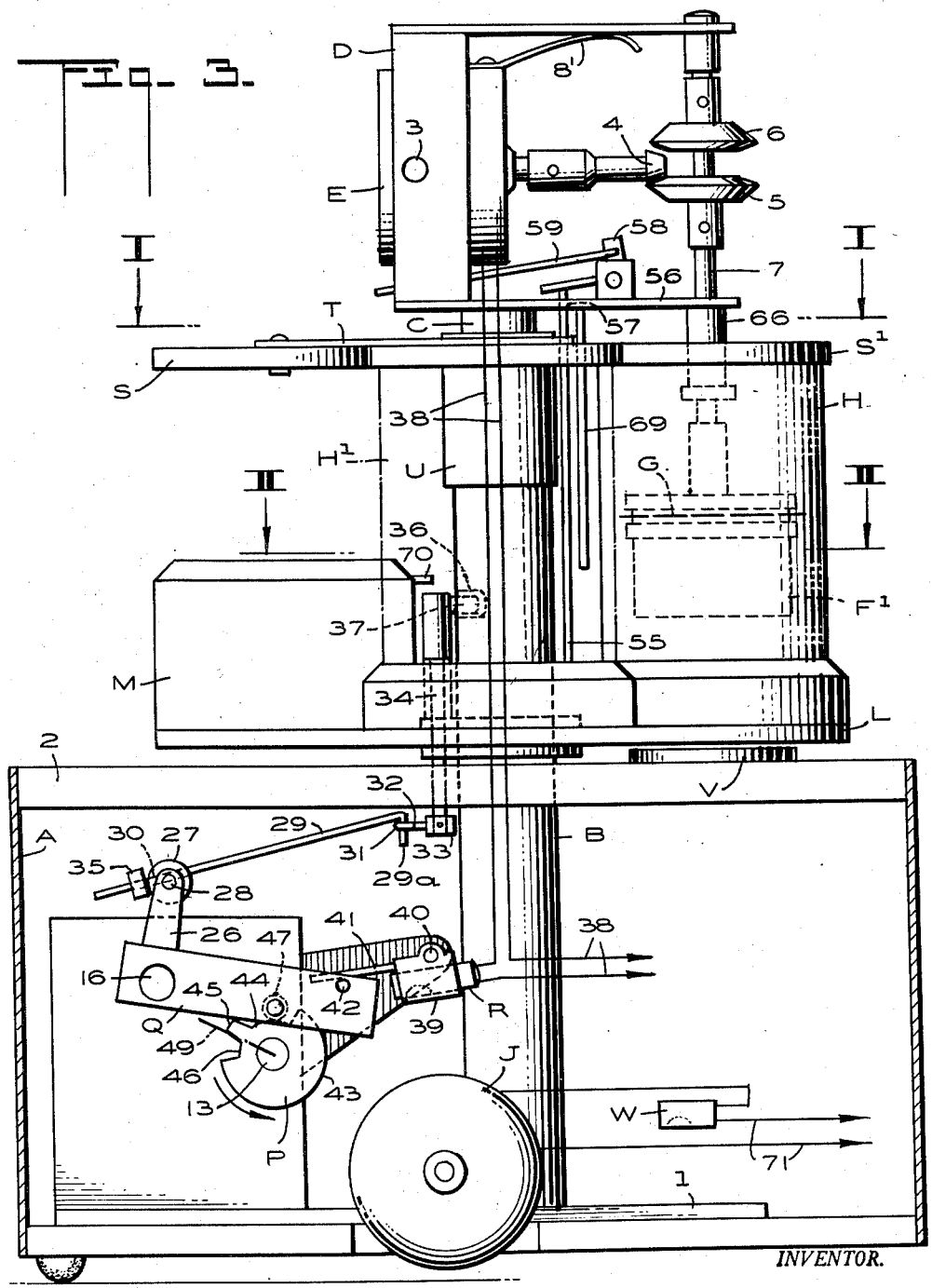
INVENTOR.
FRANKLIN C. FISHER
BY
Munn & Liddy
ATTORNEYS

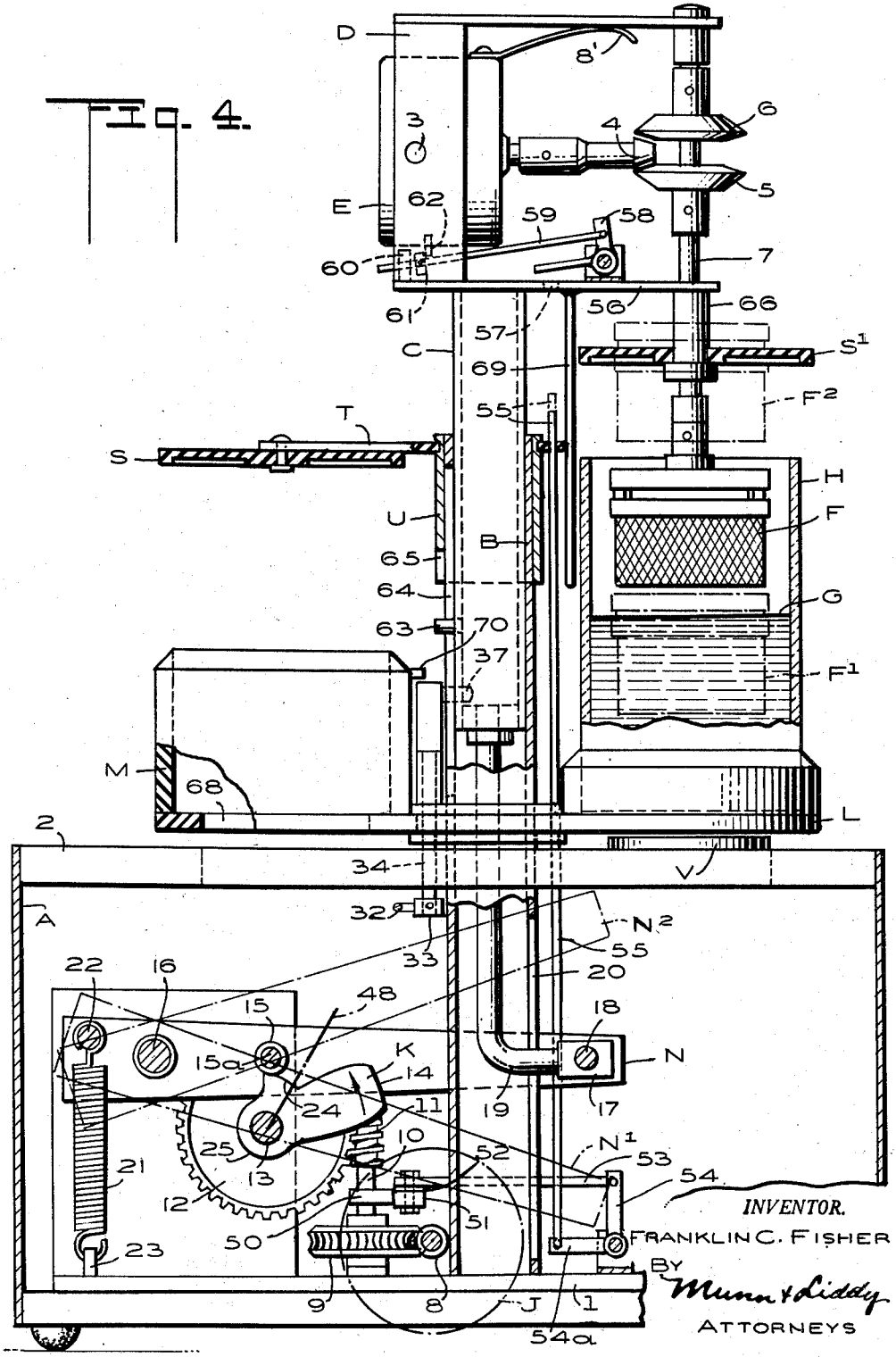

United States Patent Office 2,784,724
Patented Mar. 12, 1957

2,784,724

MACHINE FOR WASHING WATCH PARTS

Franklin C. Fisher, San Francisco, Calif.

Application August 8, 1955, Serial No. 526,904

4 Claims. (Cl. 134—58)

An object of my invention is to provide a machine for washing watch parts which is an improvement over my Patent No. 2,721,563, issued October 25, 1955. In my copending patent, I show two uprights for reciprocably supporting a basket-carrying frame. In the present case I show a single upright for supporting the basket-carrying frame. An electric motor is carried by this frame and is used for rotating a basket in which are mounted the watch parts.

One of the novel features of the invention is the provision of a braking mechanism that will rigidly connect the basket-carrying frame to the single upright when the motor is operated for rotating the basket. The braking mechanism is automatically actuated when the basket is rotated in a fluid, and is again actuated when the basket is raised into a spin-off position where the basket is positioned above the liquid level. Furthermore, the same means that is used for actuating the braking mechanism is also used for closing the switch that connects the basket-rotating motor with a source of electrical current.

In the copending patent, I disclose three jars and a heating element mounted on a turntable, these four items being disposed 90° apart from each other. One of the jars contained a watch-washing solution and the other two jars carried a rinsing fluid. No covers are provided for the three jars. My present invention discloses covers for the jars. Novel means is provided for automatically lifting the covers above the jars each time the turntable is rotated 90° for bringing another jar or the heater into a position for receiving the basket.

A fourth cover is mounted on the spindle for the basket and is positioned above the basket. This fourth cover closes the jar top in which the basket is received and is raised to a higher level than the other covers during the rotation of the turntable, because it is necessary that the basket clear the top of the jar in which it has been received before the turntable is rotated through one-fourth of a circle.

In all other respects, the construction and operation of the present invention is the same as that disclosed in the copending patent. The drawings only set forth the features that differ from the copending patent.

Other objects and advantages will appear in the following specification, and the novel features of the device will be particularly pointed out in the appended claims.

My invention is illustrated in the accompanying drawings forming a part of this application in which.

Figure 1:
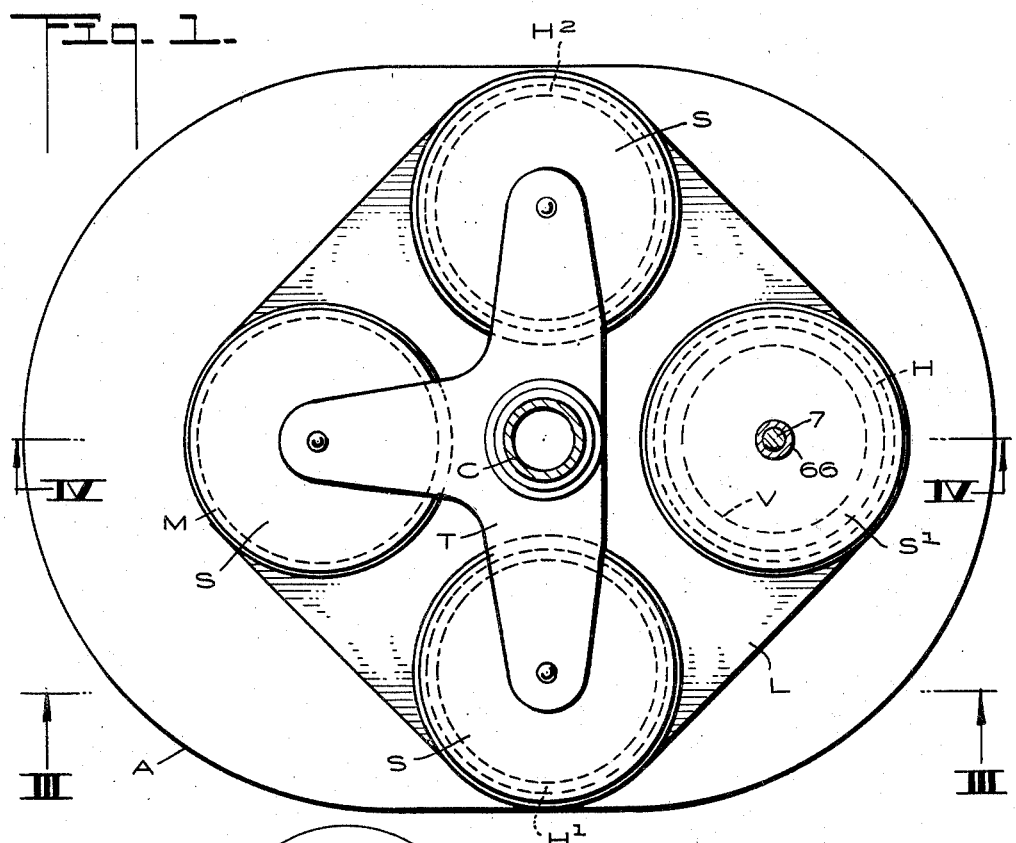
Figure 1 is a horizontal section through the machine and is taken along the line I—I of Figure 3.

Figure 3 is a side elevation of the machine with the base casing being cut along the line III—III of Figure 1, and being shown in section in order to illustrate the brake-actuating mechanism; and Figure 4 is a vertical section through the machine taken along the line IV—IV of Figure 1, portions being shown in elevation and illustrates the mechanism for raising and lowering the basket-carrying frame.

While I have shown only the preferred form of my invention, it should be understood that various changes or modifications may be made within the scope of the appended claims without departing from the spirit and scope of the invention.

In carrying out my invention, I provide a casing indicated generally at A in Figures 1, 3 and 4. This casing houses the same mechanism as shown in my copending application with the exception of the changes which will be set forth in the present case. A tubular column B rises vertically from a supporting base 1 that is enclosed in the casing. A cover 2 or platform closes the top of the casing and has an opening through which the column B extends.

A sliding column C is reciprocably mounted within the stationary column B and the top of the column C projects above the top of the column B. A motor and basket-carrying frame D is mounted on top of the inner column C and is designed to be raised and lowered by the column in a manner hereinafter described. A basket-rotating motor E is pivotally carried by the frame D at 3, so as to be free to rock about a horizontal axis. The motor-shaft carries a cone-shaped friction member 4 that is positioned between two larger cone-shaped members 5 and 6. The cones 5 and 6 are spaced one above the other and are keyed to a vertical shaft 7 which in turn is rotatably carried by the frame D.

A leaf spring 8', mounted on the motor E and bearing against the frame D exerts a force on the motor to swing it in a clockwise direction about the pivots 3 and move the motor cone 4 into frictional yielding engagement with the lower cone 5. The shaft 7 extends below the frame D and removably supports a basket F. The shaft 7 is long enough to cause the basket F to be immersed in a fluid G, contained in a jar H, see Figure 4, when the basket-carrying frame D is lowered by a mechanism now to be described.

*Basket raising and lowering mechanism*

A motor J is mounted on the base 1 and has a worm 8 meshing with a worm gear 9, that is keyed to a vertical shaft 10. A second worm 11 is rotated by the shaft 10 and meshes with a second worm gear 12. The latter gear is keyed to the main cam shaft 13. I show a cam K mounted on the cam shaft and having the shape seen in Figure 4. The cam has a high portion 14 that has a length sufficient to support the basket F above the top of the jar H until the turntable L is rotated through an arc of 90° to bring the next jar into position.

Figure 2:
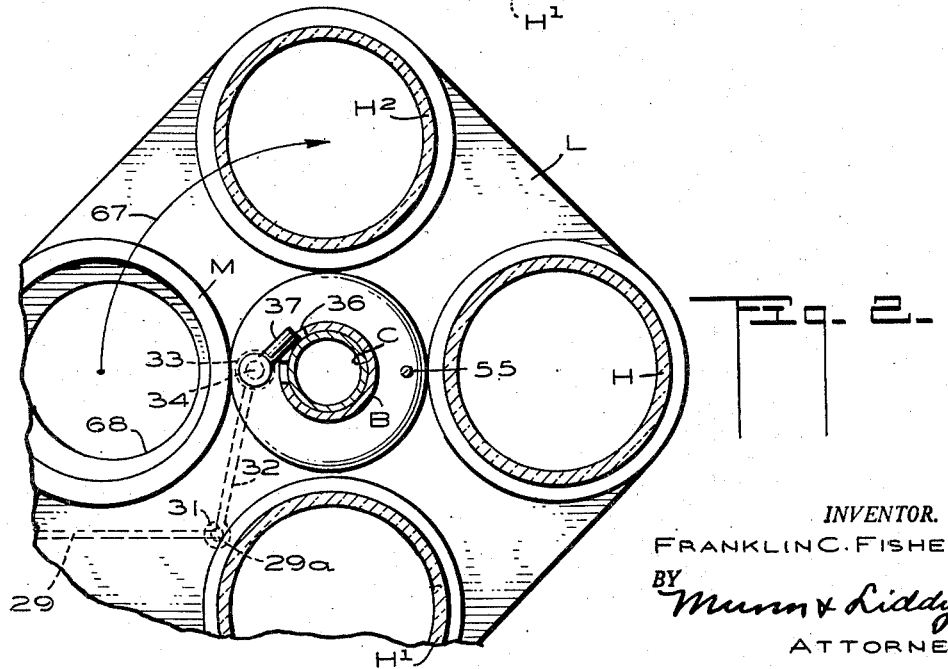
Figure 2 is a second horizontal section through the machine and is taken along the line II—II of Figure 3.

Reference to Figures 1 and 2 show the turntable L as supporting three jars. The lowermost jar H in Figure 2 carries a watch-washing fluid while the next two jars when reading in a counter-clockwise direction, carry a first rinse and a second rinse fluid respectively. A dryer M is placed on the turntable L and positioned between the wash and second rinse jars. The turntable could be rotated by hand, but I prefer to use the mechanism disclosed in my Patent No. 2,645,236, issued July 14, 1953. It is not necessary to repeat the disclosure in the present case, suffice to say that, when the basket completes its washing and spin-off rotation in the jar (hereinafter described), the cam K through the mechanism now to be described, will raise the basket above the jar top and it is at this point that the turntable rotating mechanism, not shown, will operate to rotate the turntable through an arc of 90°. The next jar will now be brought into registration with the basket.

A cam-following roller 15 rides on the cam K and is carried by a lever N which in turn is fulcrumed on a pivot shaft 16. The lever N is in two identical parts that are spaced a slight distance from each other in order to straddle the central vertical column B. The cam-following roller 15 rotates on a stub shaft 15a that extends between and is supported by the two parts of the lever. At the free end of the lever N, I mount a block 17 that is pivotally mounted on a pin 18 which in turn extends between the two parts of the lever. An L-shaped rod 19 has one end secured to the block 17 and its other end is connected to the inner column C. The outer column B has a shaft 20 therein for slidably receiving the rod 19.

The cam K will move the frame D and basket F into three different positions during one complete rotation of the cam in a counter-clockwise direction. A coil spring 21 is connected to the lever N at 22 and to the base 1 by a lug 23. The cam K has an intermediate arcuate portion 24 on which the cam follower roller 15 rides when the basket is in the full line position in Figure 4. The basket is in spin-off position at this point and is supported above the level of the liquid G, but it still remains within the jar H. The basket is spun in only one direction when in spin-off position and this will be explained when the operation of the machine is set forth.

The cam K also has a low arcuate portion 25 and when the roller 15 rides on this portion, the lever N will be in the dot-dash line position $N^1$, and the frame D will lower the basket F in the jar H so as to immerse the basket in the liquid G, as shown by the lowest dot-dash line position $F^1$ in Figure 4. When the roller 15 rides on the high arcuate portion 14 of the cam, the lever N will be in the highest dot-dash line position $N^2$, and the basket F will be lifted above the top of the jar H, indicated by the highest dot-dash line position $F^2$ in Figure 4. The basket F is not rotated by the motor E when the frame D lifts the basket above the jar top H.

*Braking mechanism*

I will now describe the novel braking means for rigidly connecting the inner column C to the outer column B when the frame D supports the basket F in washing position $F^1$ and in spin-off position F. Figure 3 shows a cam P mounted on the cam shaft 13. A lever Q is free to rock on the pivot shaft 16. Before describing how the lever Q is acted upon by the cam P, as the latter rotates in a counter-clockwise direction, it is best to set forth the various parts making up the braking mechanism.

The lever Q carries an arm 26 that in turn has a block 27 pivotally mounted therein and designed to rotate about a horizontal axle 28, carried by the arm. A rod 29 is slidably mounted in a transversely extending bore 30, provided in the block 27, and both Figures 2 and 3 show the right hand end of the rod 29, provided with a hook portion 29a that is received in an eye 31 formed in the outer end of an arm 32. The arm 32 extends radially from a collar 33 that is pinned to the lower end of a vertically-extending shaft 34. A collar 35 is mounted at the left-hand end of the rod 29, see Figure 3, and bears against the block 27, so that when the arm 26 is swung to the left by the counter-clockwise swing of the lever Q, the rod will swing the arm 32 for rocking the shaft 34 in a clockwise direction when looking at Figure 2.

Both Figures 2 and 3 show the outer column B, provided with a recess 36 for permitting a braking member 37, projecting radially from the enlarged top of the shaft 34, to enter the recess and press against the outer surface of the inner column C, for forcing this column laterally against the inner surface of the outer column B and thus temporarily connecting them together as a unit, each time the arm 26 moves the rod 29 to the left in Figure 3. It will further be noted that the counter-clockwise swinging of the lever Q in Figure 3, will actuate a switch R, to close it and connect the motor E to a source of current, as indicated by the wires 38. The mercury switch R is mounted in a saddle 39 which in turn is pivotally supported at 40. An arm 41 projects to the left of the saddle 39 and acts as a counter-weight to keep the switch in open position. The lever Q carries a pin 42 that will lift the arm 41 when the lever is lifted and will swing the switch R into closed position when the brake is applied for binding the inner column C to the outer column B. The cam P is provided with low and high points for causing the lever Q to act in a predetermined manner.

The cam P makes one complete revolution in a counter-clockwise direction each time the cam K makes a complete revolution because both are keyed to the same cam shaft 13. Figure 3 shows the cam P when reading in a counter-clockwise direction, first provided with an elongated high point 43, then with a low point 44, followed by a short high point 45, and finally by a short low point 46. A cam follower roller 47 is mounted on the lever Q and rides on the cam P. The roller 47 is shown on the low point 44 of the cam and therefore the brake will not be applied and the switch R will be open. The turntable L will be rotated through 90° when the cam P is in this position. It should be noted however that the rotation of the turntable takes place when the roller 47 just enters the low point 44 of the cam. The other cam K at this moment will have its high point 14, see Figure 4, lifting the roller 15 and lever N to the high position $N^2$ for raising the basket F above the jar H. The cam K will permit the roller 15 to ride down to the low point 25 before the roller 47 rides on to the high point 43 of the cam P. The basket F will register with the next jar H before it is lowered and it will enter the liquid in the jar before it starts spinning. This is accomplished by having the roller 47 ride upon the high point 43 of the cam P, and close the switch R to the motor E, immediately after the roller 15 descends from the high point 14 of the cam K, to the low point.

I have shown a heavy dot-dash line 48 on the cam K in Figure 4, and another heavy dot-dash line 49 on the cam P in Figure 3. These two heavy dot-dash lines when brought into registration with each other and the cams K and P, similarly rotated, will represent the exact relation of the two cams with respect to each other as they operate in the machine. When the cam follower roller 47 rides on the high point 43 of the cam P, the brake 37 will be applied to bind the column C to the column B, and the switch R will be closed to start the motor E, operating. The motor will rotate the cone 4.

In the copending patent I disclose means for rotating the basket F, first in one direction and then in the opposite direction, this alternate rotation continuing for a number of times while the basket remains immersed in the fluid G. Figure 4 shows the mechanism for accomplishing this. A cam 50 is mounted on the vertical shaft 10, and bears against a roller 51 which in turn is mounted on an arm 52. The arm 52 is free to swing in a horizontal plane about a pivot (not shown) and a link 53 is pivotally connected to the arm and to a bell-crank lever 54. The horizontal arm 54a of the bell-crank lever is pivotally connected to the lower end of an upwardly extending rod 55. As the shaft 10 and cam 50 are rotated, the rod 55 will be raised and lowered as indicated by the full and dot-dash line positions of the rod in Figure 4.

The basket-carrying frame D has a lower platform 56 provided with an opening 57, through which the top of the rod 55 projects when the frame is in its lowest position, as shown in Figure 3. A bell-crank lever 58 is pivotally mounted on the platform 56 and is acted upon by the top end of the rod 55. A link 59 is connected to the bell-crank lever and has its free end slidably mounted in a bearing block 60. A collar 61 is adjustably secured to the link 59 and engages with a depending projection 62, carried by the motor casing E. It will therefore be seen that as soon as the motor J is started, the rod 55 will be continuously reciprocated in a vertical direction. The rod will actuate the bell-crank lever 58 to rock the motor E about its pivot 3, only when the frame D is in its lowermost position. When the rod 55 is in its lowermost position, the motor-driven cone-shaped member 4 will contact the lower cone-shaped member 5 and rotate the basket F in one direction. When the cam 50 raises the rod 55, the motor E will be swung to bring the cone 4 into engagement with the upper cone 6 and the basket will be rotated in the opposite direction.

The alternate rotation of the basket F, first in one direction and then in the opposite direction, is carried on only so long as the basket remains immersed in the fluid G. The low cam portion 25 on the cam K determines the length of time the basket remains submerged. At the completion of the washing operation in the wash jar, shown at H¹ in Figure 2, the basket is raised by the cam K lifting the frame D to spin-off position. The short cam portion 24 on the cam K, determines this position. Figure 4 shows the basket F in spin-off position, and here the basket will be rotated continuously in one direction to throw off the wash fluid from the watch parts by centrifugal force. The frame D, while in spin-off position, is lifted above the top of the rod 55, see Figure 4, and therefore the cone 4 will only contact the lower cone 5. The purpose of the alternate spinning of the basket F while it is in the wash solution, is to prevent voids being formed in the liquid where the basket is received and therefore a thorough washing will take place. The brake 37 is automatically applied during the washing and spin-off positions because the brake is actuated by the same lever Q that also controls the switch R which in turn connects the basket-rotating motor E to the source of current.

Cover-lifting mechanism

It is best now to describe the cover-lifting mechanism. In Figure 1, I show three covers S carried by a three-armed spider T. Figure 4 shows the spider T connected to a sleeve U that is slidably mounted on the outer surface of the tubular and stationary column B. The sliding column C that rides within the column A, has an outwardly projecting pin 63 that is slidably received in a slot 64, provided in the stationary column B. The lower end of the sleeve U has a recess 65, registering with the slot 64 and adapted to receive the pin 63, after the column C has been raised a predetermined distance. The covers S will close the tops of two of the three jars H, H¹ and H², while the frame D is in its lowest position and in its intermediate position.

A fourth cover S¹, see Figure 4, is mounted on a shouldered sleeve 66 that in turn is rigidly connected to the lower platform 56 of the frame D. The sleeve 66 also acts as a bearing for the shaft 7. The cover S¹ rests on top of the jar while the basket F is immersed in the fluid G, see Figure 3. When the frame D raises the basket into spin-off position, the cover S¹ will be lifted above the top of the jar as shown in Figure 4. It is when the spin-off operation is completed, and the basket F raised out of the jar to the position F², that the other three covers S are raised so that they will clear whatever jars they are resting upon, and the turntable L is free to rotate the jars through an arc of 90° to bring the first rinse jar H into a position to receive the basket.

The raising of the three covers S is accomplished by the pin 63 reaching the end of the recess 65 in the sleeve U, lifting the sleeve and with it, the covers S. The portion 14 of the cam K will hold the column C, and therefore the sleeve U and covers S in their highest raised positions until the turntable has completed its one-quarter turn and has brought the first rinse jar H into a position to receive the basket F.

The basket when lowered into the first rinse jar, will be rotated several revolutions in one direction and then in the opposite direction for several revolutions for the prescribed time period. The watch parts will be rinsed of the washing solution. This is followed by the spin-off and then the basket is raised clear of the rinse jar H, and the turntable will bring the second rinse jar H² into registration with the basket. The turntable L is rotated clockwise through one quarter of a circle each time it is actuated, as indicated by the arrow 67 in Figure 2. The mechanism for accomplishing this is shown in my copending patent.

After the basket has gone through the rinse and spin-off operations in the second rinse jar H², the basket F is raised to clear the jar and the turntable will operate to bring the dryer M into registration with an electric heater V, see Figures 3 and 4. The heater is mounted on the top of the base cover 2 and is connected to a source of electric current as soon as the machine starts operating. The dryer M is in the form of a cylinder, see Figure 4, and the turntable L has an opening communicating with the cylinder. When the turntable is rotated to bring the dryer M into a position to receive the basket F, the heater V will register with the opening 68 so that heat will enter the cylinder.

It should be noted at this point that the lower platform 56 of the frame D, has a depending rod 69 of a predetermined length. The dryer M carries a projection 70 that extends outwardly from the outer cylindrical surface thereof. This projection is brought into registration with the depending rod 69 when the turntable L brings the dryer M into registration with the basket F. The lower end of the depending rod 69 will come to rest on the projection 70 as the cam K lowers the frame D. The rod 69 will support the frame D so that the bell-crank 58 will be disposed above the top of the reciprocating rod 55 and therefore will not be actuated by this rod. The result is that the motor E will rotate the basket F in only one direction while the basket is received in the dryer M. The watch parts will be thoroughly dried during the drying operation.

After the machine completes its drying operation, it is automatically disconnected from the electric source. In Figure 3, I show a switch W that is designed to connect the motor J to a source of current through the wires 71 when the switch is closed. In the copending patent, this switch is automatically opened when the machine completes its cycle of washing, double rinsing, and drying. The operation of the machine has been set forth in the description of the various parts and therefore no further description need be given of the operation.

The machine completes its cycle with the basket F being raised above the dryer M. The three jars H, H¹ and H² will be closed by the three covers S when the machine completes its cycle and therefore the liquid G in the three jars will be prevented from evaporating. During the washing and rinsing operations, the auxiliary cover S¹ will close the jar top in which the basket F is disposed.

I claim:

1. In a device of the type described: an outer stationary tubular vertical column; an inner column slidably mounted in the outer column and projecting thereabove; a jar for holding a liquid; a frame carried by the top of the inner column; a motor-driven shaft depending from the frame; a basket carried by the shaft; means for lowering the frame for causing the basket to enter the liquid in the jar; a motor carried by the frame and operatively connected to the shaft; a brake adapted to be applied to the inner column for forcing it against the inner surface of the outer column for rigidly connecting the two columns together; and means for actuating the brake and at the same time connecting the motor to a source of current; whereby the two columns will be held together as a unit during the rotation of the basket in the fluid, thus reducing vibration in the device.

2. In a device of the type described: an outer stationary tubular vertical column; an inner column slidably mounted in the outer one and having its top projecting above the outer column; a jar having a liquid therein; a frame carried by the top of the inner column; a motor carried by the frame; a shaft depending from the frame and operatively connected to the motor; a basket carried by the shaft; means for supporting the frame in a position for immersing the basket in the liquid; said means also being adapted to support the frame in a position for holding the basket above the liquid, but still within the jar; a brake adapted to be applied to the inner column when the frame is in either of the two said positions for forcing it against the inner surface of the outer column for rigidly connecting the two columns together; and means for simultaneously actuating the brake and connecting the motor to a source of current, whereby vibration is reduced during the operation of the motor, shaft and basket.

3. In a device of the type described: a turntable; a plurality of jars supported by the turntable and being spaced apart; said jars having volatile liquids therein; a basket-carrying frame including a motor; a depending vertically-arranged shaft operatively connected to the motor, and a basket supported and rotated by the shaft and adapted to enter the jars; means for raising the frame for lifting the basket clear of the jar in which it was received; means timed with said first-named means for rotating the turntable for bringing the next jar into registration with the basket while said first-named means supports the basket clear of the jars; said first-named means being timed with said second-named means for lowering the basket into the next successive jar when the latter is brought into proper registration for receiving the basket; a jar cover carried by the basket-supporting shaft and closing the top of the jar when the basket is received therein; means for supporting additional jar covers that will cover the remaining jars when the basket is received in one of them; said last-named means being coupled with said first-named basket lifting means by a delayed action that will lift the additional covers after the basket has been lifted clear of its jar and just prior to the second-named means rotating the turntable for bringing the next jar into place to receive the basket; said coupling between the first-named means and the additional cover supporting and moving means causing the latter to lower the additional covers upon the jars disposed therebelow at the start of the downward movement of the basket into the jar in registration therewith; and means for connecting the motor to a current source for rotating the basket when it is in the jar and for disconnecting the motor from the source when the basket is raised out of the jar.

4. In a device of the type described: a vertically movable frame having a vertically depending shaft for supporting a basket; a motor pivotally carried by the frame; a reversing mechanism operatively connecting the shaft to the motor and causing the shaft to rotate in one direction when the motor is in a certain position, and causing the shaft to rotate in the opposite direction when the motor is swung into a different position; a turntable supporting a plurality of jars and a heating unit, adapted to bring the jars and heating unit successively into registration with the shaft; means for alternately tilting the motor for causing the shaft to rotate the basket first in one direction and then in the opposite direction when the frame lowers the shaft and the basket into its lowest position in the jars; a stop carried by the heating unit; means carried by the frame and coming to rest on said stop when the heating unit is brought into registration with the shaft for preventing said motor tilting means from rocking the motor; whereby the motor will rotate the shaft continuously in one direction for drying the parts carried by the basket.

References Cited in the file of this patent

UNITED STATES PATENTS

| | | |
|---|---|---|
| 1,310,495 | Ford | July 22, 1919 |
| 2,195,123 | Pabst | Mar. 26, 1940 |
| 2,341,198 | Weiskopf | Feb. 8, 1944 |